United States Patent
Koskinen et al.

(10) Patent No.: US 9,319,942 B2
(45) Date of Patent: Apr. 19, 2016

(54) SYSTEMS, METHODS, AND APPARATUSES FOR FACILITATING A CIRCUIT SWITCHED CONNECTION

(75) Inventors: Jussi-Pekka Koskinen, Oulu (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 131 days.

(21) Appl. No.: 13/321,111

(22) PCT Filed: Mar. 23, 2010

(86) PCT No.: PCT/FI2010/050220
§ 371 (c)(1),
(2), (4) Date: Feb. 13, 2012

(87) PCT Pub. No.: WO2010/133750
PCT Pub. Date: Nov. 25, 2010

(65) Prior Publication Data
US 2012/0127957 A1  May 24, 2012

Related U.S. Application Data

(60) Provisional application No. 61/179,134, filed on May 18, 2009.

(51) Int. Cl.
*H04W 36/00* (2009.01)
(52) U.S. Cl.
CPC .................. *H04W 36/0022* (2013.01)
(58) Field of Classification Search
CPC ............ H04W 36/0005; H04W 36/0011; H04W 36/14; H04W 36/0016; H04W 36/0022
USPC ......... 370/331, 351–356, 360; 455/428, 436, 455/439
See application file for complete search history.

(56) References Cited

U.S. PATENT DOCUMENTS

2004/0246990 A1* 12/2004 Krishnamurthi et al. ..... 370/466
2004/0252674 A1* 12/2004 Soininen et al. .............. 370/352
(Continued)

FOREIGN PATENT DOCUMENTS

EP  242924 A1  10/1987
GB  2450322 A  12/2008
(Continued)

OTHER PUBLICATIONS

R2-080922 solution for redirection ver2.pdf, "A solution for service-based redirection", 3GPP TSG-RAN WG2 #61, Feb. 2008, pp. 1-3.*
R3-091231_E-UTRAN access information.pdf, "E-UTRAN/UTRAN access-related information transfer", 3GPP TSG-RAN3#64, May 2009,pp. 1-10.*
(Continued)

*Primary Examiner* — Paul H Masur
*Assistant Examiner* — Kabir Jahangir
(74) *Attorney, Agent, or Firm* — Mintz Levin Cohn Ferris Glovsky and Popeo, P.C.

(57) ABSTRACT

Systems, methods, and apparatuses are provided for facilitating a circuit switched connection. A method may include receiving redirection information broadcast by a network node on a packet switched network. The redirection information may include information about a circuit switched capable cell to facilitate a circuit switched connection. The method may additionally include determining that a user equipment is an end point for a communication requiring a circuit switched connection. The method may further include establishing a connection with the circuit switched capable cell based at least in part upon the redirection information. Corresponding systems and apparatuses are also provided.

11 Claims, 6 Drawing Sheets

(56) References Cited

U.S. PATENT DOCUMENTS

| | | | |
|---|---|---|---|
| 2006/0039326 A1* | 2/2006 | Jeong et al. | 370/329 |
| 2006/0120295 A1* | 6/2006 | Scholtens et al. | 370/248 |
| 2006/0221890 A1* | 10/2006 | Qian et al. | 370/328 |
| 2008/0293403 A1* | 11/2008 | Quon et al. | 455/426.1 |
| 2009/0005048 A1* | 1/2009 | Bae et al. | 455/439 |
| 2010/0085962 A1* | 4/2010 | Issaeva et al. | 370/355 |
| 2010/0098023 A1* | 4/2010 | Aghili et al. | 370/331 |
| 2010/0220680 A1* | 9/2010 | Ramankutty et al. | 370/329 |
| 2011/0080867 A1* | 4/2011 | Mildh | 370/328 |

FOREIGN PATENT DOCUMENTS

| | | |
|---|---|---|
| WO | WO-9836591 A1 | 8/1998 |
| WO | WO-2004032539 A1 | 4/2004 |
| WO | WO-2005122609 A2 | 12/2005 |
| WO | 2008/148429 A1 | 12/2008 |
| WO | 2009/070072 A1 | 6/2009 |

OTHER PUBLICATIONS

"3rd Generation Partnership Project; Technical Specification Group Services and System Aspects; Circuit Switched Fallback in Evolved Packet System; Stage 2 (Release 8)", 3GPP TS 23.272, v8.3.0, Mar. 2009, pp. 1-47.

International Search Report and Written Opinion received for corresponding Patent Cooperation Treaty Application No. PCT/FI2010/050220, dated Jun. 29, 2010, 13 pages.

"3rd Generation Partnership Project; Technical Specification Group Services and System Aspects; Circuit Switched Fallback in Evolved Packet System; Stage 2 (Release 8)", 3GPP TS 23.272, v1.1.0, Apr. 2008, pp. 1-25.

Salkintzis et al., "Voice Call Handover Mechanisms in Next-Generation 3GPP Systems", IEEE Communications Magazine, vol. 47, Issue 2, Feb. 2009, pp. 46-56.

NEC: "CSFB Support Indication by the Network". 3GPP Draft, S2-085481. 3GPP TSG-SA WG2 Meeting #67. Sophia Antiplois, France. Aug. 2008.

* cited by examiner

SYSTEMS, METHODS, AND APPARATUSES FOR FACILITATING A CIRCUIT SWITCHED CONNECTION

RELATED APPLICATION

This application was originally filed as PCT Application No. PCT/FI2010/050220, filed Mar. 23, 2010, which claims priority benefit from U.S. Provisional Patent Application No. 61/179,134, filed May 18, 2009.

TECHNOLOGICAL FIELD

Embodiments of the present invention relate generally to communication technology and, more particularly, relate to systems, methods, and apparatuses for facilitating a circuit switched connection.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards. Another example of a modern communications system being developed is time division-synchronous code division multiple access (TD-SCDMA).

However, coverage by these new networking technologies, which may comprise packet switched (PS) networks (e.g., an Internet Protocol (IP) Multimedia Subsystem (IMS) capable network), may not be universal as they are deployed. Moreover, as these new PS networks are deployed, they may not initially support all modes of communication. For example, upon initial deployment of a PS network, full IMS support for voice over IP (VoIP) may not be provided by the PS network and accordingly the PS network may not support a voice call. Additionally or alternatively, a mobile terminal connected to a PS network may be configured to engage in certain communications, such as voice calls, via circuit switched services of another network. Accordingly, a mobile terminal connected to a PS network may not be able to engage in a voice call unless transferred to a legacy circuit switched (CS) network configured to support voice calls.

BRIEF SUMMARY OF SOME EXAMPLES OF THE INVENTION

Systems, methods, apparatuses, and computer program products are therefore provided for facilitating a circuit switched connection. In this regard, embodiments of the invention facilitate circuit switched fallback (CSFB). Systems, methods, apparatuses, and computer program products are provided that may provide several advantages to computing devices and network operators. Embodiments of the invention provide redirection information to a user equipment attached to a PS network prior to the user equipment being an end point for a communication requiring a CS connection. A user equipment (UE) according to embodiments of the invention is configured to use redirection information provided by the PS network to establish connection with a CS network upon determining that the UE is an end point for a communication requiring a CS connection, reducing the need for exchange of messages between the UE and PS network prior to the UE establishing a connection with a network supporting CS connections. This reduction in the need for exchange of messages between the UE and PS network provided by embodiments of the invention may facilitate faster setup of a communication requiring a CS connection by reducing the time required for a UE to establish a connection to the CS network.

In a first exemplary embodiment, a method is provided, which comprises receiving, at a user equipment, redirection information broadcast by a network node on a packet switched network, wherein the redirection information comprises information about a circuit switched capable cell to facilitate a circuit switched connection. The method of this embodiment further comprises determining that the user equipment is an end point for a communication requiring a circuit switched connection. The method of this embodiment additionally comprises establishing a connection with the circuit switched capable cell based at least in part upon the redirection information.

The user equipment may be attached to the packet switched network in idle mode prior to establishing the connection with the circuit switched capable cell. The network node on the packet switched network may comprise a mobility management entity. The packet switched network may comprise an evolved universal mobile telecommunications system terrestrial radio access network, wireless local area network, or time division-synchronous code division multiple access network. The packet switched network may not support circuit switched services. The circuit switched capable cell may comprise a cell implementing Universal Mobile Telecommunications System Terrestrial Radio Access Network technology (UTRAN) or Global System for Mobile Communications Enhanced Data Rates for Global System for Mobile Communications Evolution Radio Access Network (GE-RAN) technology.

Receiving the redirection information may comprise receiving the redirection information prior to initial establishment of the communication requiring a circuit switched connection. The redirection information may comprise one or more of an identity of the circuit switched capable cell, information about a radio access technology of the circuit switched capable cell, band information for the circuit switched capable cell, carrier information for the circuit switched capable cell, or reselection priority information for the circuit switched capable cell. Receiving the redirection information may comprise receiving a system information message comprising the redirection information over a broadcast control channel.

The determination that the user equipment is an end point for a communication requiring a circuit switched connection may be performed by a circuit switched communication enabler of the user equipment. The communication requiring a circuit switched connection may comprise a voice call. The user equipment may comprise an originating or terminating end point for the communication.

Determining that the user equipment is an end point for a communication requiring a circuit switched connection may comprise determining that a user of the user equipment has originated a communication at the user equipment requiring a circuit switched connection. The method of this embodiment may further comprise receiving a paging request and determining that the user equipment is an end point for a communication requiring a circuit switched connection may comprise determining that the paging request indicates that the user equipment is a terminating end point for a communication requiring a circuit switched connection.

Establishing a connection with a circuit switched capable cell based at least in part upon the redirection information may comprise sending a radio resource control connection request to the circuit switched capable cell. Alternatively, establishing a connection with a circuit switched capable cell based at least in part upon the redirection information may comprise sending a random access request message to the circuit switched capable cell.

The redirection information may further comprise information about one or more additional circuit switched capable cells. The method of this embodiment may further comprise determining the circuit switched capable cell from among the circuit switched capable cell and the one or more additional circuit switched capable cells based at least in part upon the redirection information. Establishing a connection with a circuit switched capable cell may comprise establishing a connection with the determined circuit switched capable cell.

In another exemplary embodiment, a computer program product is provided. The computer program product includes at least one tangible computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for causing redirection information broadcast by a network node on a packet switched network to be received, wherein the redirection information comprises information about a circuit switched capable cell to facilitate a circuit switched connection. The second program instruction of this embodiment is for determining that a user equipment is an end point for a communication requiring a circuit switched connection. The third program instruction of this embodiment is for establishing a connection with the circuit switched capable cell based at least in part upon the redirection information. The program instructions of this embodiment are arranged to, when run on a processor or processing means comprised in an apparatus, cause the apparatus to perform the method described herein.

In another exemplary embodiment, an apparatus is provided. The apparatus of this embodiment comprises a processor and a memory storing instructions that when executed by the processor cause the apparatus or another apparatus to receive redirection information broadcast by a network node on a packet switched network, wherein the redirection information comprises information about a circuit switched capable cell to facilitate circuit switched connection. The instructions of this embodiment when executed by the processor further cause the apparatus or the another apparatus to determine that the apparatus or the another apparatus is an end point for a communication requiring a circuit switched connection. The instructions of this embodiment when executed by the processor additionally cause the apparatus or the another apparatus to establish a connection with the circuit switched capable cell based at least in part upon the redirection information. The processor of this embodiment is operably connected to the memory and capable of retrieving instructions therefrom.

In another exemplary embodiment, an apparatus is provided, which comprises means for receiving redirection information broadcast by a network node on a packet switched network, wherein the redirection information comprises information about a circuit switched capable cell to facilitate circuit switched fallback. The apparatus of this embodiment further comprises means for determining that the apparatus is an end point for a communication requiring a circuit switched connection. The apparatus of this embodiment additionally comprises means for establishing a connection with the circuit switched capable cell based at least in part upon the redirection information.

In another exemplary embodiment, a method is provided, which comprises accessing, at a network node on a packet switched network, redirection information comprising information about a circuit switched capable cell. The method of this embodiment further comprises broadcasting the redirection information to facilitate a circuit switched connection such that a user equipment attached to the packet switched network is enabled to receive the redirection information and use the redirection information to establish a connection to the circuit switched capable cell when the user equipment is an end point for a communication requiring a circuit switched connection.

The network node on the packet switched network may comprise a mobility management entity. The packet switched network may comprise an evolved universal mobile telecommunications system terrestrial radio access network. The circuit switched capable cell may comprise a cell implementing Universal Mobile Telecommunications System Terrestrial Radio Access Network technology (UTRAN) or Global System for Mobile Communications Enhanced Data Rates for Global System for Mobile Communications Evolution Radio Access Network (GERAN) technology. The user equipment may be attached to the packet switched network in idle mode.

Broadcasting the redirection information may comprise broadcasting the redirection information prior to initial establishment of the communication requiring a circuit switched connection. The redirection information may comprise one or more of an identity of the circuit switched capable cell, information about a radio access technology of the circuit switched capable cell, band information for the circuit switched capable cell, carrier information for the circuit switched capable cell, or reselection priority information for the circuit switched capable cell. Broadcasting the redirection information may comprise broadcasting a system information message comprising the redirection information over a broadcast control channel. Broadcasting the redirection information may comprise broadcasting redirection information comprising information about one or more additional circuit switched capable cells.

In another exemplary embodiment, a computer program product is provided. The computer program product includes at least one tangible computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for accessing, at a network node on a packet switched network, redirection information comprising information about a circuit switched capable cell. The second program instruction of this embodiment is for causing the redirection information to be broadcasted to facilitate a circuit switched connection such that a user equipment attached to the packet switched network is enabled to receive the redirection information and use the redirection information to establish a connection to the circuit switched capable cell when the user equipment is an end point for a communication requiring a circuit switched connection.

In another exemplary embodiment, an apparatus is provided. The apparatus of this embodiment comprises a processor and a memory storing instructions that when executed by the processor cause the apparatus or another apparatus to access redirection information comprising information about a circuit switched capable cell. The apparatus of this embodiment comprises a network node on a packet switched network. The instructions of this embodiment when executed by the processor further cause the apparatus or the another apparatus to broadcast the redirection information to facilitate a circuit switched connection such that a user equipment attached to the packet switched network is enabled to receive the redirection information and use the redirection information to establish a connection to the circuit switched capable cell when the user equipment is an end point for a communication requiring a circuit switched connection.

In another exemplary embodiment, an apparatus is provided, which includes means for accessing redirection information comprising information about a circuit switched capable cell. The apparatus comprises a network node on a packet switched network. The apparatus of this embodiment further comprises means for broadcasting the redirection information to facilitate a circuit switched connection such that a user equipment attached to the packet switched network is enabled to receive the redirection information and use the redirection information to establish a connection to the circuit switched capable cell when the user equipment is an end point for a communication requiring a circuit switched communication.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
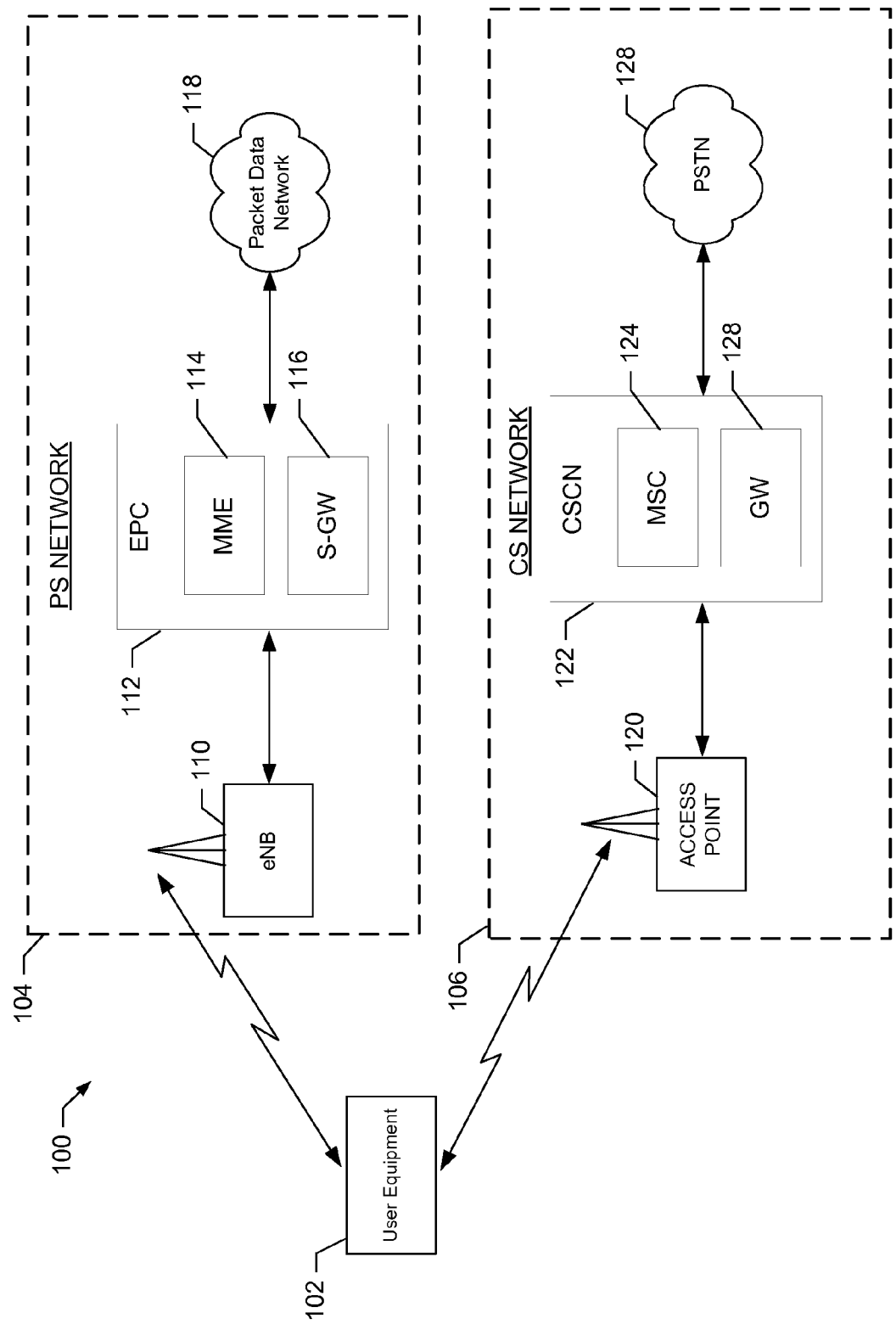
FIG. 1 illustrates a system for facilitating a circuit switched connection according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for facilitating a circuit switched connection, such as by facilitating circuit switched fallback according to an exemplary embodiment of the present invention. As used in the scope of this document, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for facilitating a circuit switched connection, numerous other configurations may also be used to implement embodiments of the present invention. Further, it will be appreciated that where references herein are made to specific types of communications networks (e.g., LTE, E-UTRAN, Global System for Mobile Communications Edge Radio Access Network (GERAN), TD-SCDMA, and/or the like) and specific terminology for system entities, it will be appreciated that embodiments of the invention are applicable to communications networks not using standards of the referenced network(s) and to system entities performing similar functions to those described herein, but which are referred to using different terminology in accordance with other network standards.

In at least some embodiments, the system 100 includes a user equipment (UE) 102, a packet switched (PS) network 104, and a circuit switched (CS) network 106. The PS network 104 may comprise any packet switched public land mobile network. In an exemplary embodiment, the PS network 104 comprises a network operating in accordance with LTE (e.g., E-UTRAN) standards. The PS network 104 may additionally or alternatively comprise a wireless local area network, a Worldwide Interoperability for Microwave Access (WiMAX) network, a TD-SCDMA network, and/or the like. The PS network 104 may not support CS services. The CS network 106 may comprise any circuit switched network, such as, for example, a circuit switched public land mobile network comprising, for example, a GERAN network, UMTS Terrestrial Radio Access Network (UTRAN), and/or the like.

The PS network 104 may comprise an evolved node B (eNB) 110 and an evolved packet core (EPC) 112. The eNB 110 may be configured to provide radio access to the UE 102 such that the UE 102 may access the PS network 104. The EPC 112 may comprise, for example, a mobility management entity (MME) 115, serving gateway (S-GW) 116, packet data node (PDN, not shown) gateway (P-GW, not shown), and/or other entities, which may provide a network architecture for managing the PS network 104. The EPC 112 may provide a connection to a network, such as the packet data network 118, which may, for example, comprise or otherwise provide access to the internet.

The CS network 106 may comprise an access point 120 and a circuit switched core network (CSCN) 122. The access point 120 may comprise a base station, node B, or other entity configured to provide radio access to the UE 102 such that the UE 102 may access the CS network 106. In some embodiments, the access point 120 comprises a base station which is connected to the CSCN 122 by means of a radio network controller node (RNC, not shown). The CSCN 122 may comprise a mobile switching center (MSC) 124, gateway 128, and/or other entities, which may provide a network architecture for managing the CS network 106 and may be configured to manage switching to facilitate voice calls and/or data transfer within the CS network 106. The CSCN 122 may provide a connection to a network, such as the public switched telephone network (PSTN) 128, which may, for example, comprise or otherwise provide access to the internet.

The UE 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to access the PS network 104 and CS network 106, and/or network 108 through radio signals exchanged with access points 110 and 120. In this regard, the UE 102 may be within radio range of both the eNB 110 and the access point 120. In some embodiments, the UE 102 may be configured to access the PS network 104 in accordance with LTE standards. In an exemplary embodiment, the UE 102 is embodied as a mobile terminal, such as that illustrated in FIG. 2.

Figure 2:
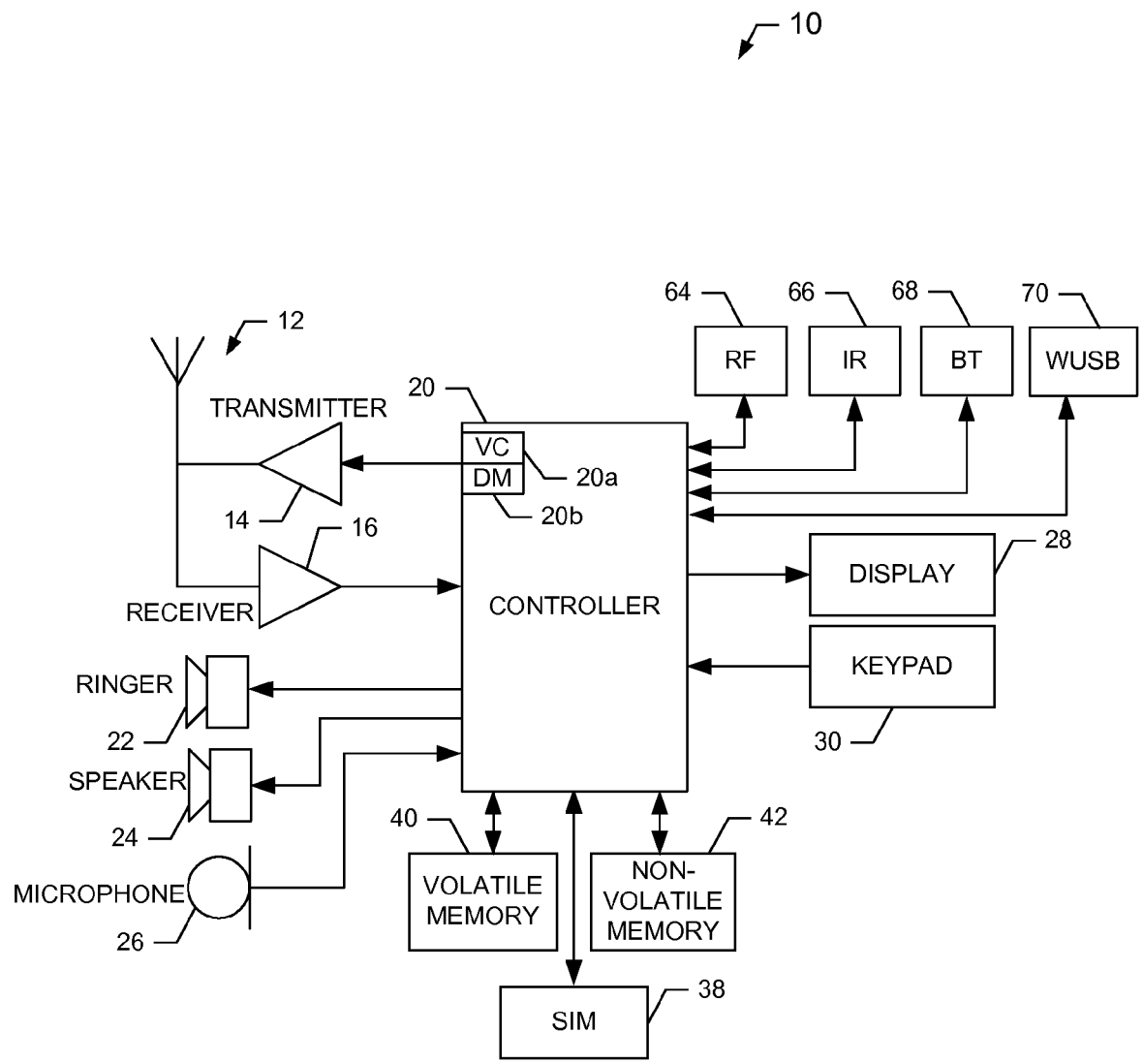
FIG. 2 is a schematic block diagram of a mobile terminal according to an exemplary embodiment of the present invention.

In this regard, FIG. 2 illustrates a block diagram of a mobile terminal 10 representative of one embodiment of a UE 102 in accordance with embodiments of the present invention. It should be understood, however, that the mobile terminal 10 illustrated and hereinafter described is merely illustrative of one type of UE 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.16 techniques, and/or the like.

The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
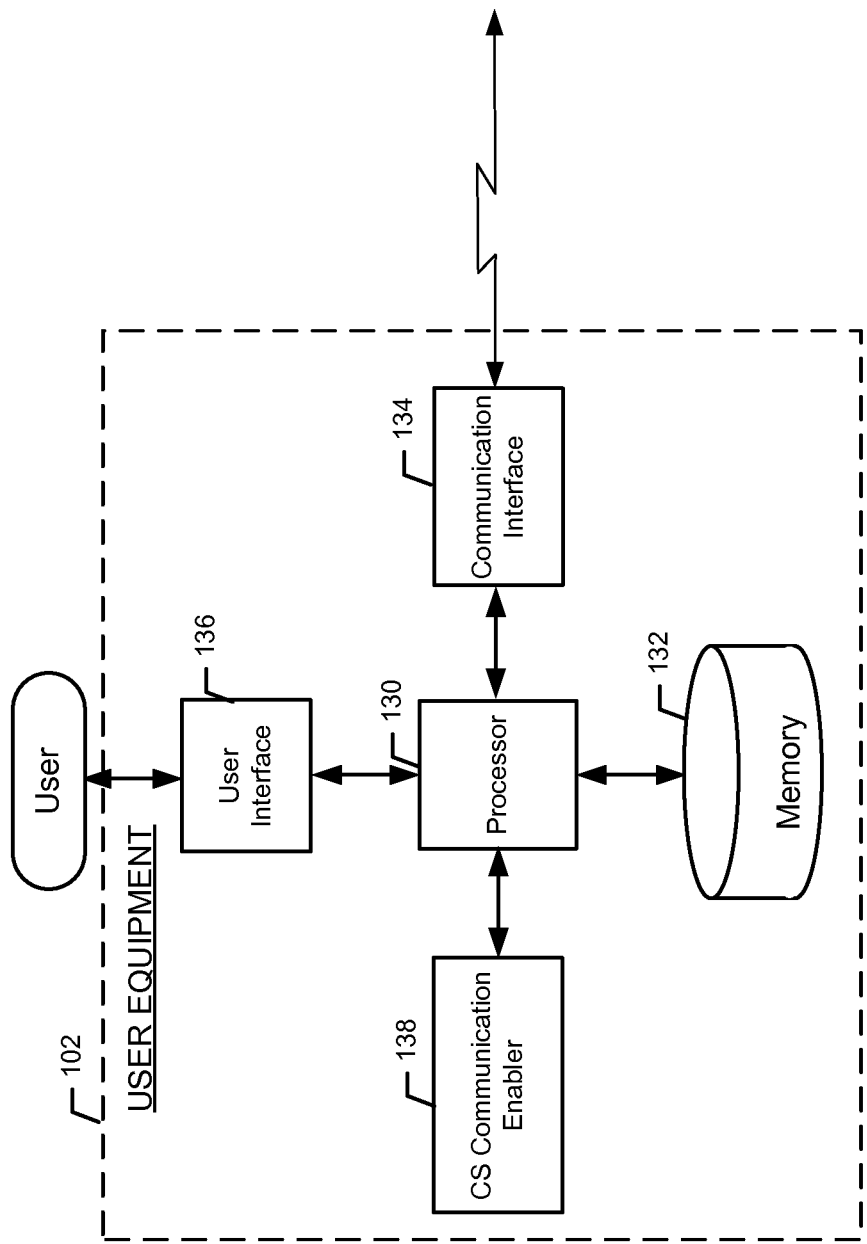
FIG. 3 illustrates a block diagram of a user equipment according to an exemplary embodiment of the present invention.

FIG. 3 illustrates a block diagram of a UE 102 according to an exemplary embodiment of the present invention. In an exemplary embodiment, the UE 102 includes various means, such as a processor 130, memory 132, communication interface 134, user interface 136, and CS communication enabler 138 for performing the various functions herein described. These means of the UE 102 as described herein may be embodied as, for example, hardware elements (e.g., a suitably programmed processor, combinational logic circuit, and/or the like), a computer program product comprising computer-readable program instructions (e.g., software or firmware) stored on a tangible computer-readable medium (e.g. memory 132) that is executable by a suitably configured processing device (e.g., the processor 130), or some combination thereof.

The processor 130 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 130 comprises a plurality of processors. The plurality of processors may be in operative communication with each other and may be collectively configured to perform one or more functionalities of the UE 102 as described herein. In an exemplary embodiment, the processor 130 is configured to execute instructions stored in the memory 132 or otherwise accessible to the processor 130. These instructions, when executed by the processor 130, may cause the UE 102 to perform one or more of the functionalities of the UE 102 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may include, for example, volatile and/or non-volatile memory. Although illustrated in FIG. 3 as a single memory, the memory 132 may comprise a plurality of memories. The memory 132 may comprise volatile memory, non-volatile memory, or some combination thereof. In this regard, the memory 132 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the UE 102 to carry out various functions in accordance with exemplary embodiments of the present invention. For example, in at least some embodiments, the memory 132 is configured to buffer input data for processing by the processor 130. Additionally or alternatively, in at least some embodiments, the memory 132 is configured to store program instructions for execution by the processor 130. The memory 132 may store information in the form of static and/or dynamic information. This stored information may be stored and/or used by the CS communication enabler 138 during the course of performing its functionalities.

The communication interface 134 may be embodied as any device or means embodied in hardware, a computer program product comprising computer readable program instructions stored on a computer readable medium (e.g., the memory 132) and executed by a processing device (e.g., the processor 130), or a combination thereof that is configured to receive and/or transmit data from/to an entity of the system 100, such as an entity of the PS network 104 and/or CS network 106. In this regard, the communication interface 134 may be configured to access the PS network 104 and/or CS network 106 by establishing a radio connection with the eNB 110 and/or access point 120. In at least one embodiment, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more entities of the system 100. The communication interface 134 may be configured to receive and/or transmit data using any protocol that may be used for communications between entities of the system 100. The communication interface 134 may additionally be in communication with the memory 132, user interface 136, and/or CS communication enabler 138, such as via a bus.

The user interface 136 may be in communication with the processor 130 to receive an indication of a user input and/or to provide an audible, visual, mechanical, or other output to a user. As such, the user interface 136 may include, for example, a keyboard, a mouse, a joystick, a display, a touch screen display, a microphone, a speaker, and/or other input/output mechanisms. The user interface 136 may provide an interface allowing a user to enter data for a communication, interact with data, send data, receive data, answer a voice call, and/or place a voice call. The user interface 136 may be in communication with the memory 132, communication interface 134, and/or CS communication enabler 138, such as via a bus.

The CS communication enabler 138 may be embodied as various means, such as hardware, a computer program product comprising computer readable program instructions stored on a computer readable medium (e.g., the memory 132) and executed by a processing device (e.g., the processor 130), or some combination thereof and, in one embodiment, is embodied as or otherwise controlled by the processor 130. In embodiments wherein the CS communication enabler 138 is embodied separately from the processor 130, the CS communication enabler 138 may be in communication with the processor 130. The CS communication enabler 138 may further be in communication with the memory 132, communication interface 134, and/or user interface 136, such as via a bus.

Figure 4:
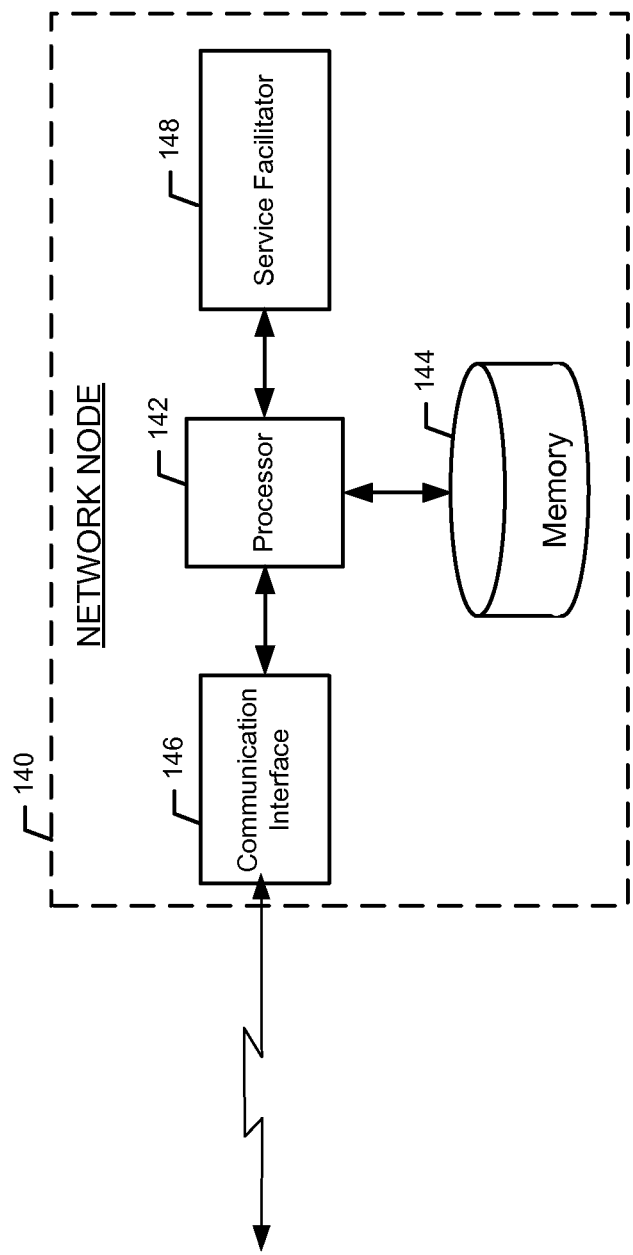
FIG. 4 illustrates a block diagram of a network node of a packet switched network according to an exemplary embodiment of the invention.

FIG. 4 illustrates a block diagram of a network node 140 of the PS network 104 according to an exemplary embodiment of the invention. In this regard, the network node 140 may comprise one or more entities of the PS network 104 and may, for example, comprise the eNB 110, EPC 112, MME 114, GW 116, some other network node(s) on the PS network 104, and/or some combination thereof. In an exemplary embodiment, the network node 140 includes various means, such as a processor 142, memory 144, communication interface 146, and service facilitator 148 for performing the various functions herein described. These means of the network node 140 as described herein may be embodied as, for example, hardware elements (e.g., a suitably programmed processor, combinational logic circuit, and/or the like), a computer program product comprising computer-readable program instructions (e.g., software or firmware) stored on a tangible computer-readable medium (e.g. memory 144) that is executable by a suitably configured processing device (e.g., the processor 142), or some combination thereof.

The processor 142 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 142 comprises a plurality of processors. The plurality of processors may be embodied on a single computing device or distributed among a plurality of computing devices, which may be collectively configured to function as a network node 140. The plurality of processors may be in operative communication with each other and may be collectively configured to perform one or more functionalities of the network node 140 as described herein. In an exemplary embodiment, the processor 142 is configured to execute instructions stored in the memory 144 or otherwise accessible to the processor 142. These instructions, when executed by the processor 142, may cause the network node 140 to perform one or more of the functionalities of the network node 140 as described herein. As such, whether configured by hardware or software methods, or by a combination thereof, the processor 142 may comprise an entity capable of performing operations according to embodiments of the present invention while configured accordingly. Thus, for example, when the processor 142 is embodied as an ASIC, FPGA or the like, the processor 142 may comprise specifically configured hardware for conducting one or more operations described herein. Alternatively, as another example, when the processor 142 is embodied as an executor of instructions, such as may be stored in the memory 144, the instructions may specifically configure the processor 142 to perform one or more algorithms and operations described herein.

The memory 144 may include, for example, volatile and/or non-volatile memory. Although illustrated in FIG. 4 as a single memory, the memory 144 may comprise a plurality of memories. The memory 144 may comprise volatile memory, non-volatile memory, or some combination thereof. In this regard, the memory 144 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 144 may be configured to store information, data, applications, instructions, or the like for enabling the network node 140 to carry out various functions in accordance with exemplary embodiments of the present invention. For example, in at least some embodiments, the memory 144 is configured to buffer input data for processing by the processor 142. Additionally or alternatively, in at least some embodiments, the memory 144 is configured to store program instructions for execution by the processor 142. The memory 144 may store information in the form of static and/or dynamic information. This stored information may be stored and/or used by the service facilitator 148 during the course of performing its functionalities.

The communication interface 146 may be embodied as any device or means embodied in hardware, a computer program product comprising computer readable program instructions stored on a computer readable medium (e.g., the memory 144) and executed by a processing device (e.g., the processor 142), or a combination thereof that is configured to receive and/or transmit data from/to an entity of the system 100, such as to a UE 102 via a radio connection between the UE 102 and eNB 110. In at least one embodiment, the communication interface 146 is at least partially embodied as or otherwise controlled by the processor 142. In this regard, the communication interface 146 may be in communication with the processor 142, such as via a bus. The communication interface 146 may include, for example, an antenna, a transmitter, a receiver, a transceiver and/or supporting hardware or software for enabling communications with one or more entities of the system 100. The communication interface 146 may be configured to receive and/or transmit data using any protocol that may be used for communications between entities of the system 100. The communication interface 146 may additionally be in communication with the memory 144 and/or service facilitator 148, such as via a bus.

The service facilitator 148 may be embodied as various means, such as hardware, a computer program product comprising computer readable program instructions stored on a computer readable medium (e.g., the memory 144) and executed by a processing device (e.g., the processor 142), or some combination thereof and, in one embodiment, is embodied as or otherwise controlled by the processor 142. In embodiments wherein the service facilitator 148 is embodied separately from the processor 142, the service facilitator 148 may be in communication with the processor 142. The service facilitator 148 may further be in communication with the memory 144 and/or communication interface 146, such as via a bus.

The UE 102 may be attached to the PS network 104. In this regard, the UE 102 may be attached to the PS network 104 in idle mode or in connected mode. The UE 102 may also be within radio range of the access point 120 and thus capable of connecting to the CS network 106. The PS network 104 may not be configured to provide for CS connections. Accordingly, when the UE 102 is an end point for an incoming or outgoing communication, such as a voice call, requiring a CS connection, the UE 102 may need to transition from the PS network 104 to a CS capable cell, such as by establishing a connection with the access point 120 of the CS network 106.

In some embodiments, the service facilitator 148 is configured to access redirection information comprising information about one or more circuit switched capable cells (e.g., information about CS network 106). The service facilitator 148 may be configured to access redirection information stored in the memory 144. Additionally or alternatively, the service facilitator 148 may be configured to access redirection information by communicating with a network node on the CS network 106 (e.g., access point 120, CSCN 122, MSC 124, GW 128, and/or other network node), such as via over air radio signaling, through a network (e.g., the packet data network 118, PSTN 128, internet, or other network), and/or over another interface.

The accessed redirection information may comprise one or more of an identity of a CS capable cell(s), information about a radio access technology of a CS capable cell(s), band information for a CS capable cell(s), carrier information for a CS capable cell(s), reselection priority information for a CS capable cell(s), and/or the like. The service facilitator 148 may be further configured to communicate the accessed redirection information to one or more UEs 102 so as to facilitate a circuit switched communication such that the UE 102 is enabled to receive the redirection information and use the redirection information to establish a connection to a CS capable cell when the UE 102 is an end point for a communication requiring a CS connection. In this regard, the service facilitator 148 may be configured to facilitate circuit switched fallback. The service facilitator 148 may be configured to communicate the redirection information to a UE 102 prior to initial establishment of a communication requiring a circuit switched connection for which the UE 102 is an end point.

In some embodiments, the service facilitator 148 is configured to communicate the redirection information to the UE 102 by broadcasting the redirection information (e.g., periodically). When broadcast, the redirection information is communicated without identifying a particular person or apparatus (e.g., without identifying a particular UE 102) as the recipient. The service facilitator 148 may be configured to broadcast the redirection information over a broadcast control channel (BCCH), such that one or more UEs 102 connected to the PS network 104 in idle mode may receive the redirection information. The service facilitator 148 may additionally be configured to include the redirection information in a system information message broadcast over the broadcast control channel.

Additionally or alternatively, the service facilitator 148 is, in some embodiments, configured to communicate the redirection information to the UE 102 by sending the redirection information to the UE 102 in dedicated control signaling. In this regard, the service facilitator 148, may, for example, be configured to send redirection information to a UE 102 connected to the PS network 104 in connected mode by sending a radio resource control (RRC) connection reconfiguration message comprising the redirection information to the UE 102.

The CS communication enabler 138 is configured in some embodiments of the invention to receive a message (e.g., a broadcast system information message, a RRC connection reconfiguration message, and/or other message comprising redirection information) comprising redirection information communicated by the network node 140. In this regard, the CS communication enabler 138 may be configured to receive a message broadcast by the network node 140 and/or a message sent to the UE 102 by the network node 140. The CS communication enabler 138 may be configured to parse the received message to extract the redirection information. The CS communication enabler 138 may be further configured to store the redirection information in the memory 132 for later use.

Subsequent to receiving the redirection information, the CS communication enabler 138 may be configured to determine that the UE 102 is an end point for a communication requiring a circuit switched connection. In this regard, if the UE 102 is an originating end point for the communication, the CS communication enabler 138 may determine that a user of the UE 102 has originated the communication, such as by dialing a number for a voice call via the user interface 136.

When the UE 102 is attached to the PS network 104 in idle mode, the CS communication enabler 138 may be configured to receive a paging request indicating that the UE 102 is a terminating point for an initiated communication. The paging request may comprise a core network (CN) domain indicator indicating a CS domain initiated the paging message and/or indicating that the communication is one that requires a CS connection. The CS communication enabler 138 may then be configured to determine that the paging request indicates that the UE 102 is a terminating end point for a communication requiring a CS connection.

When the UE 102 is attached to the PS network 104 in connected mode, the CS communication enabler 138 may be configured to receive a network access stratum (NAS) message for CS communication establishment with a CN domain indicator indicating a CS domain initiated the communication. The NAS message, may, for example, comprise a DLInformationTransfer message. The CS communication enabler 138 may then be configured to determine that the NAS message indicates that the UE 102 is a terminating end point for a communication requiring a CS connection.

Once the CS communication enabler 138 has determined that the UE 102 is an end point for a communication requiring a CS connection, the CS communication enabler 138 may be configured, in response to the determination, to access the previously received redirection information and establish a connection with a CS capable cell (e.g., with the CS network 106) based at least in part upon the redirection information. In this regard, the CS communication enabler 138 may be configured to use the redirection information to determine a CS capable cell to establish a connection with and/or determine parameters for establishing a connection with the CS capable cell. If the previously received redirection information includes information about a plurality of CS capable cells, the CS communication enabler 138 may be configured to determine a CS capable cell from the plurality of CS capable cells and establish a connection with the determined CS capable cell.

When the UE 102 is attached to the PS network 104 in connected mode, the CS communication enabler 138 may be configured to send a connection release message to the network node 140 requesting a release of the UE 102 from the PS network 104. The connection release message may, for example, comprise a RRC Connection Release Indication/Request. The connection release message may comprise an indication that the UE 102 wants to perform redirection according to the previously received redirection information.

When establishing a connection with a CS capable cell, the CS communication enabler 138 may be configured to send a CS connection establishment request to a network node on a CS capable cell based at least in part upon the redirection information. In this regard, the CS communication enabler 138 may be configured to establish a radio connection with the access point 120 of the CS network 106 and send a CS connection establishment request to a network node of the CS network, such as, for example, to the CSCN 122. When the CS network 106 implements UTRAN radio access technology, the CS connection establishment request may comprise a RRC connection request message. When the CS network 106 implements GERAN radio access technology, the CS connection establishment request may comprise a random access message. Depending on the content of the received redirection information available to the CS communication enabler 138, the CS communication enabler 138 may be configured to determine the radio access technology implemented by the CS network 106 and/or other cell operation parameters and format the CS connection establishment request based at least in part upon the determined cell operation parameters.

Figure 5:
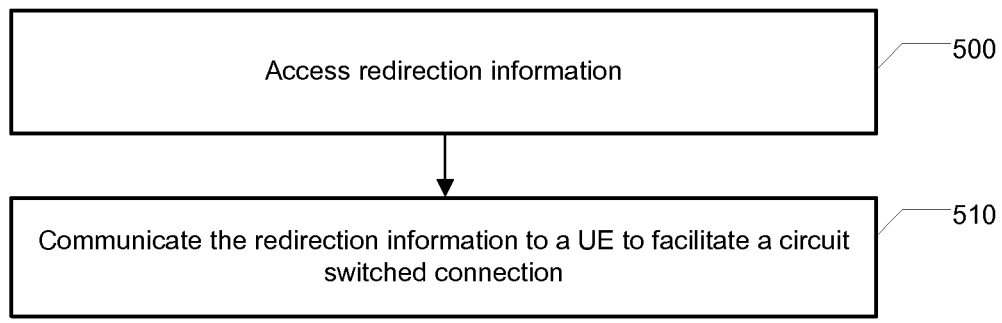
FIGS. 5-6 illustrate flowcharts according to exemplary methods for facilitating a circuit switched connection according to exemplary embodiments of the invention.

FIG. 5 illustrates a flowchart according to an exemplary method for facilitating a circuit switched connection according to an exemplary embodiment of the invention. In this regard, FIG. 5 illustrates operations that may occur at the network node 140. The method may include the service facilitator 148 accessing redirection information, at operation 500. Operation 510 may comprise the service facilitator 148 communicating redirection information to the UE 102 to facilitate a circuit switched connection. In this regard, operation 510 may comprise the service facilitator 148 broadcasting the redirection information to the UE 102. Additionally or alternatively, operation 510 may comprise the service facilitator 148 sending the UE 102 a dedicated control signaling message comprising the redirection information.

Figure 6:
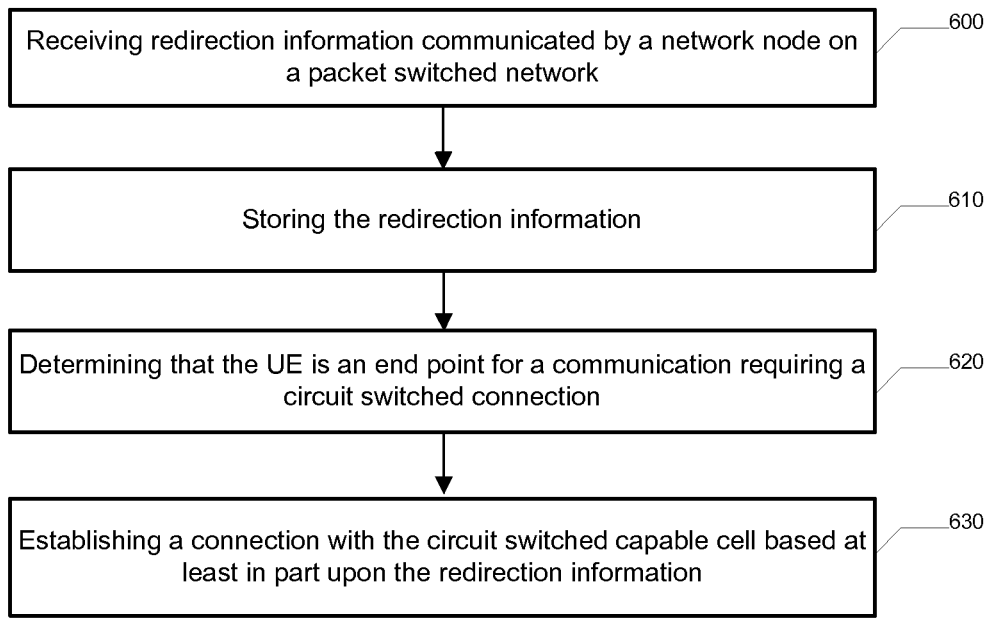

FIG. 6 illustrates a flowchart according to an exemplary method for facilitating a circuit switched connection according to an exemplary embodiment of the invention. In this regard, FIG. 6 illustrates operations that may occur at the UE 102. The method may include the CS communication enabler 138 receiving redirection information communicated by the network node 140, at operation 600. The redirection information may be received in a message and operation 600 may further comprise the CS communication enabler 138 parsing or otherwise extracting the redirection information from the message. Operation 610 may comprise the CS communication enabler 138 storing the redirection information for later use. The CS communication enabler 138 may then determine that the UE 102 is an end point for a communication requiring a circuit switched connection, at operation 620. Operation 630 may comprise the CS communication enabler 138 establishing a connection with a CS capable cell (e.g., the CS network 106) based at least in part upon the redirection information.

FIGS. 5-6 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and network operators. Embodiments of the invention provide redirection information to a user equipment attached to a PS network prior to the user equipment being an end point for a communication requiring a CS connection. A user equipment (UE) according to embodiments of the invention is configured to use redirection information provided by the PS network to establish connection with a CS network upon determining that the UE is an end point for a communication requiring a CS connection. Accordingly, embodiments of the invention facilitate establishing a CS connection, such as through CSFB, while reducing the need for exchange of messages between the UE and PS network prior to the UE establishing a connection with a network supporting CS connections. This reduction in the need for exchange of messages between the UE and PS network provided by embodiments of the invention may facilitate faster setup of a communication requiring a CS connection by reducing the time required for a UE to establish a connection to the CS network.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, at a user equipment attached to a packet switched network, redirection information broadcast by a network node on the packet switched network, wherein the redirection information comprises information about a circuit switched capable cell to facilitate a circuit switched connection, wherein the redirection information is received before the circuit switched connection is initiated;
determining, after receiving the redirection information, that the user equipment is an end point for a communication requiring a circuit switched connection, wherein the end point determination is based at least in part on at least one of the user equipment originating the circuit-switched connection or the user equipment receiving a paging request indicating the user equipment is the end point for the communication requiring the circuit switched connection; and
establishing a connection with the circuit switched capable cell based at least on the redirection information, wherein the establishing includes sending a random access request message to the circuit switched capable cell.

2. A method according to claim 1, wherein the packet-switched network is a long term evolution network.

3. A method according to claim 1, wherein the redirection information comprises at least one of an identity of the circuit switched capable cell, information about a radio access technology of the circuit switched capable cell, band information for the circuit switched capable cell, carrier information for the circuit switched capable cell, and reselection priority information for the circuit switched capable cell.

4. A method according to claim 1, wherein the receiving the redirection information comprises receiving a system information message comprising the redirection information over a broadcast control channel.

5. An apparatus comprising a processor and at least one memory operably connected to the processor, the at least one memory storing instructions that when executed by the processor cause the apparatus or another apparatus to at least:
receive redirection information broadcast by a network node on a packet switched network, wherein the apparatus is attached to the packet switched network, and wherein the redirection information comprises information about a circuit switched capable cell to facilitate a circuit switched connection, wherein the redirection information is received before the circuit switched connection is initiated;
determine, after receiving the redirection information, that the apparatus is an end point for a communication requiring a circuit switched connection, wherein the end point determination is based at least in part on at least one of the user equipment originating the circuit-switched connection or the user equipment receiving a paging request indicating the user equipment is the end point for the communication requiring the circuit switched connection; and
establish a connection with the circuit switched capable cell based at least in part upon the redirection information, wherein the establishing of the connection includes sending a random access request message to the circuit switched capable cell.

6. An apparatus according to claim 5, wherein the packet-switched network is a long term evolution network.

7. An apparatus according to claim 5, wherein the redirection information comprises at least one of an identity of the circuit switched capable cell, information about a radio access technology of the circuit switched capable cell, band information for the circuit switched capable cell, carrier information for the circuit switched capable cell, and reselection priority information for the circuit switched capable cell.

8. An apparatus according to claim 5, wherein the receiving the redirection information comprises receiving a system information message comprising the redirection information over a broadcast control channel.

9. An apparatus according to claim 5, wherein the apparatus comprises a user equipment.

10. A non-transitory computer-readable storage medium including computer program instructions which when executed by at least one processor causes operations comprising:
- receiving, at a user equipment attached to a packet switched network, redirection information broadcast by a network node on the packet switched network, wherein the redirection information comprises information about a circuit switched capable cell to facilitate a circuit switched connection, wherein the redirection information is received before the circuit switched connection is initiated;
- determining, after receiving the redirection information, that the user equipment is an end point for a communication requiring a circuit switched connection, wherein the end point determination is based at least in part on at least one of the user equipment originating the circuit-switched connection or the user equipment receiving a paging request indicating the user equipment is the end point for the communication requiring the circuit switched connection; and
- establishing a connection with the circuit switched capable cell based at least on the redirection information, wherein the establishing includes sending a random access request message to the circuit switched capable cell.

11. A method comprising:
- receiving, at a user equipment attached in at least one of an idle mode or a connected mode to a packet switched network, redirection information broadcast by a network node on the packet switched network, wherein the redirection information comprises information about a circuit switched capable cell to facilitate a circuit switched connection, wherein the redirection information is received before the circuit switched connection is initiated;
- determining, after receiving the redirection information, that the user equipment is an end point for a communication requiring a circuit switched connection, wherein the end point determination is based at least in part on at least one of the user equipment originating the circuit-switched connection or the user equipment receiving a paging request indicating the user equipment is the end point for the communication requiring the circuit switched connection; and
- establishing, in response to the determination, a connection with the circuit switched capable cell based at least on the redirection information, wherein the establishing includes sending a random access request message to the circuit switched capable cell.

* * * * *